3,146,251
PREPARATION OF LINEAR SILOXANES
Paul L. Brown, Saginaw, and James Franklin Hyde, Midland, Mich., assignors to Dow Corning Corporation, Midland, Mich., a corporation of Michigan
No Drawing. Filed July 31, 1961, Ser. No. 127,832
3 Claims. (Cl. 260—448.8)

This invention relates to a method of preparing linear siloxanes by reacting hexaorganocyclotrisiloxanes with water or an alcohol or a silanol or a siloxanol in the presence of a basic amino compound.

The common commerical methods of preparing linear siloxanes from cyclic siloxanes employ bond-rearranging catalysts such as strong acids, e.g., HCl, or strong bases, e.g., alkali metal hydroxides and quaternary ammonium hydroxides. It is desirable, however, to be able to prepare such linear siloxanes from cyclic siloxanes without the bond rearrangement attendant to the use of the disruptive strong acids and bases. Such a system would make possible, for example, the production of practically pure linear trisiloxanes rather than a distribution of products including linear disiloxanes, trisiloxanes, tetrasiloxanes, pentasiloxanes and the like. Control of species purity in homopolymers would ultimately make possible more uniform block copolymers.

It is the principal object of this invention to provide a method for preparing linear siloxane polymers from cyclic trisiloxanes without the use of a bond-rearranging catalyst. It is a further object of this invention to provide a method for opening cyclic trisiloxane rings and endblocking the resulting linear trisiloxanes or incorporating them into block copolymers. Another object of this invention is the provision of such methods employing basic catalysts whereby the final product can be stabilized by easy removal of the catalyst.

This invention relates to a method which comprises reacting a hexaorganocyclotrisiloxane free of active hydrogen with a hydroxylated compound selected from the group consisting of water, hydrocarbon alcohols of no more than about eight carbon atoms and organosilicon compounds of the formulae $$R(SiR_2O)_nH \text{ and } HO(SiR_2O)_nH$$

in which each R is an organic radical free of active hydrogen and each $n$ is a positive integer in contact with a basic amino compound having a basic dissociation constant in dilute solution in water ranging from $10^{-7}$ to $10^{-1}$ at 25° C.

The hexaorganocyclotrisiloxane employed in this invention is a compound of the formula $(R_2SiO)_3$ in which each organic radical R can be any monovalent hydrocarbon radical or any monovalent hydrocarbon ether radical either of which can contain functions which will not interfere with the reaction of this invention either by entering into the polymeric structure or reacting with the amine catalyst. The R radicals must be free of active hydrogen. An "active hydrogen" atom is defined for this invention as one which forms methane when a compound containing said "active hydrogen" is reacted with methyl magnesium iodide at room temperature. The most common function which can be present in the R radicals is the halogen function, i.e., chlorine, bromine, iodine and fluorine. Preferably, any chlorine, bromine and iodine atoms are attached to an aromatic group.

As stated above each R can be any monovalent hydrocarbon radical or any monovalent hydrocarbon ether radical. More specifically, R can be, for example, any alkyl radical such as the methyl, ethyl, isopropyl, tertbutyl, 2-ethylhexyl, dodecyl, octadecyl and myricyl radials; any alkenyl radical such as the vinyl, allyl, decenyl and hexadienyl radicals; any cycloalkyl radical such as the cyclopentyl and cyclohexyl radicals; any cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can also contain such functions as aromatic halogens to form, for example, such radicals as the 2,4,6-trichlorobenzyl, perchlorophenyl, 2-bromonaphthyl and p-iodophenylethyl radicals. R can be any fluorinated monovalent hydrocarbon radical such as, for example, the 3,3,3-trifluoropropyl, α,α,α-trifluorotolyl, 3,3,3 - trifluoro - 2 - trifluoromethylamyl and p-fluorophenyl radicals. Likewise R can be any of various corresponding monovalent hydrocarbon ether radicals such as the —CH$_2$CH$_2$OCH$_2$CH$_3$,

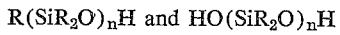

—CH$_2$(OCH$_2$CH$_2$)$_2$OCH$_3$, —CH$_2$OCH$_2$CH=CH$_2$,

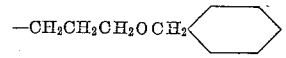

and furyl radicals and their fluorinated or halogenoaromatic counterparts such as the —CF$_2$CF$_2$OCF$_2$CF$_3$,

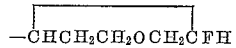

and

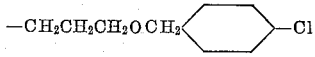

radicals.

The hydroxylated compound employed in this invention can be water. The hydroxylated compound can also be any hydrocarbon alcohol of no more than about eight carbon atoms. The alcohols are hydrocarbons which contain hydroxyl groups attached to non-aromatic, i.e., aliphatic or alicyclic, carbon atoms. These alcohols can be primary, secondary and tertiary alcohols and can contain one, two, three or more of the alcoholic hydroxyl groups. More specifically, the alcohols can be monohydric alcohols such as methanol, ethanol, isopropanol, 2-butanol, tert-butanol, 2-methyl-2-pentanol, 2-ethyl-1-hexanol, allyl alcohol, 2-buten-1-ol, benzyl alcohol, o-tolylcarbinol, 2-methyl-3-hexyn-2-ol, cyclopentanol, 2-phenylethanol and 2-propyn-1-ol; dihydric alcohols such as 2-methyl-2,3-butanediol, glycol, 3-butene-1,2-diol, erythrol, 1,5-hexadiene-3,4-diol, 1,8-octanediol and pinacol; trihydric alcohols such as glycerol and polyhydric alcohols such as rhamnitol. These alcohols are all well known in the art. Where the alcohol is insoluble in the polymer, a mutual solvent can be employed.

The hydroxylated compound can also be organosilicon compound such as silanols of the formulae $R_3SiOH$ and $R_2Si(OH)_2$ and siloxanols of the formulae $$HO(SiR_2O)_nSiR_2OH \text{ and } R_3Si(OSiR_2)_nOH$$

in which R and $n$ are as defined above. As a practical matter $n$ should be no more than about 2000 although $n$ can be 10,000 or more.

The amine component serving as a catalyst in the method of this invention can be any amino compound having a basic dissociation constant as defined above. Thus, the amino compound can be ammonia, a primary amine, a secondary amine, a tertiary amine or any combination of these. These are not rearrangement catalysts as are the quaternary ammonium bases which are excluded by the $10^{-1}$ maximum limitation on the dissociation constant. However, to be operative in the instant method, the amines must have a basic dissociation constant above $10^{-7}$ at 25° C. Examples of operative amines include the following: sec-butylamine, diethylbenzylamine, diethylamine, diisoamylamine, diisobutylamine, dimethylamine, dimethylbenzylamine, dipropylamine, ethylamine, ethylenediamine, hydrazine, isoamylamine, isobutylamine, isopropylamine, menthanediamine, methylamine, methyldiethylamine, t-octylamine, t-nonylamine, piperidine, n-propylamine, t-octadecylamine, tetramethylenediamine, triethylamine, triisobutylamine, trimethylamine, trimethylenediamine, tripropylamine, benzylamine, cinchonidine, o-methoxybenzylamine, m-methoxybenzylamine, p-methoxybenzylamine, N,N-methoxybenzylamine, o-methylbenzylamine, m-methylbenzylamine, p-methylbenzylamine, N,N-methylbenzylamine, epsilon-phenylamylamine, delta-phenylbutylamine, β-phenylethylamine, β-phenylethylmethylamine, gamma-phenylpropylamine, N,N-isopropylbenzylamine, piperazine, t-butyl-2,4-dinitrophenylamine, t-butyl-4-isonitrosoamylamine, t-octylamylamine, t - octyl - 2 - (β - butoxyethoxy)ethylamine and veratrine.

Also operative herein are condensation products of an aliphatic aldehyde and an aliphatic primary amine, such as the condensation products of formaldehyde and methylamine, acetaldehyde and allylamine, crotonaldehyde and ethylamine, isobutyraldehyde and ethylamine, acrolein and butylamine, α,β-dimethylacrolein and amylamine, butyraldehyde and butylamine, acrolein and allylamine and formaldehyde and heptylamine.

Ammonia can be used as a catalyst either by exposure of the organosilicon composition to ammonia in a closed system or by generating the ammonia in situ as by the decomposition of a compound such as ammonium carbonate in contact with the organosilicon composition.

Also operative as catalysts are such materials as the disiloxanes of the formulae O[Si(CH$_3$)$_2$(CH$_2$)$_n$NH$_2$]$_2$ disclosed in U.S. Patent 2,557,803 and silanes of the formulae [(C$_6$H$_5$)(CH$_3$)$_2$Si(CH$_2$)$_n$]CHNH$_2$ and

[(CH$_3$)$_3$Si(CH$_2$)$_n$]CHNH$_2$ disclosed in U.S. Patent 2,66,909.

The amine catalyst and the hydroxylated compound employed in this invention can be a single compound as, for example, in diethanolamine, 2-aminoethanol, 2-butylaminoethanol, 2-diethylaminoethanol, 2,2'-ethyliminodiethanol, 2-methylaminoethanol, t-butyl-2-hydroxy-5-nitrobenzylamine, 2-amino-2-ethyl-1,3-propanediol, pseudoephedrine(d), triethanolamine, 1,3-diamino-2-propanol, aminoethylethanolamine, 1-hydroxyethyl-2-heptadecenylglyoxalidine, 1-N,N-dibutylamino-2-propanol, di(ethylhexyl)ethanolamine, N,N'-dihydroxyethyl ethylene diamine, N-ethyl ethanolamine and α-methylbenzyl monoethanolamine. The amine portions will catalyze the reaction of the alcohol portions with the cyclic trisiloxanes. Consequently, combination ingredients such as those listed above are considered to be included within the scope of the claims.

The first products of the method of this invention are compounds of the general formula R'O(SiR$_2$O)$_3$H in which R' is the residue of the hydroxylated compound employed, i.e., an organosilicon residue, an alcoholic residue or hydrogen when water is the hydroxylated compound. The silicon-bonded hydroxyl groups of the linear trimers produced also attack the cyclic trisiloxanes endblocking the resulting linear trimer in a similar manner to produce mixtures of compounds of the general formula R'O(SiR$_2$O)$_n$H in which each R is an organic radical as described above, each R' is the residue of the hydroxylated compound employed and $n$ is a multiple of 3. When the original ingredients do not include silanols, the water or alcohol must be the original attacking force. In other words the formation of any linear diorganopolysiloxanes in the systems employed herein prove the existence of a reaction of the hydroxylated component with the hexaorganotrisiloxane component.

To isolate stable products it is necessary to remove the catalytic basic amino compound under mild conditions. It is preferable therefore to employ a simple amino composition such as ammonia or an amine made up of nitrogen, hydrogen and carbon. Preferably, the amine is a monoamine having attached thereto no more than about six carbon atoms in order that the vapor pressure of the amine is sufficiently low to permit easy removal from the system by heating and/or evacuation.

Heating the system at temperatures up to about 200° C. can be tolerated.

The method of this invention is primarily useful for making linear polymers from cyclic trisiloxanes in a relatively simple mild system avoiding the extensive bond rearrangement which is common to the well-known systems employing alkali metal catalysts and the like. The method of this invention is also useful for the preparation of low molecular weight linear diorganopolysiloxanes which are hydroxy-endblocked on one end and alkoxy-endblocked on the other end. This method is useful furthermore in providing the claimed low molecular weight difunctional linear diorganopolysiloxane which are useful in the preparation of block copolymers. This method is also useful for the preparation of block copolymers by reacting for example [R$_2$SiO]$_3$ with HOSiR$_2$OH in which the R substituents differ.

The best method of practicing this invention is illustrated in the following examples. However, these examples are not intended to limit the invention which is properly delineated in the claims.

*Example 1*

55.5 grams of hexamethylcyclotrisiloxane, 36 grams of n-butanol and 2 grams of di-n-hexylamine were shaken together at room temperature for 336 hours. The system was stripped to 120° C. at 10 mm. Hg leaving a residue weighing 52.6 grams. This residue was primarily C$_4$H$_9$O[Si(CH$_3$)$_2$O]$_9$H.

*Example 2*

A mixture of 55.5 grams of hexamethylcyclotrisiloxane and 46 grams of ethanol was saturated with ammonia and sealed in a glass container. The cyclic trimer dissolved in less than 4 hours at room temperature. After standing for from 64 to 72 hours, the mixture was stripped to 50° C. at 2 mm. Hg leaving a residue weighing 56 grams. This residue contained 6.3 percent by weight ethoxyl radicals and 2.4 percent by weight hydroxyl radicals indicating the residue was primarily C$_2$H$_5$O[Si(CH$_3$)$_2$O]$_9$H.

*Example 3*

A mixture of 50 grams sym-tris-3,3,3-trifluoropropyltrimethylcyclotrisiloxane, 50 cc. of a 29 percent by weight solution of ammonia in water equivalent to 13 grams of NH$_3$ and 246.5 grams of water and 50 cc. of acetone were mixed together for 16 hours at room temperature. The reaction product was thoroughly water-washed and stripped under vacuum at 30 to 40° C. The viscosity of the product was 130.1 cs. at 25° C. indicating that the product was substantially

HO[(CF$_3$CH$_2$CH$_2$)Si(CH$_3$)O]$_3$H

*Example 4*

Sym-trimethyltrivinylcyclotrisiloxane was shaken with the above 29 percent aqueous ammonia solution in a weight ratio of 2:1 respectively for 16 hours at room temperature. The siloxane layer was separated, dissolved in diethylether, washed neutral with water and stripped at 55° C. The resulting product was a mixture of polysiloxanes of the formula HO[SI(C$_2$H$_3$)(CH$_3$)O]$_n$H in which $n$ is a multiple of 3, said mixture having a viscosity at 25° C. of 45.8 cs.

*Example 5*

A mixture of 50 grams of sym-triphenyltrimethylcyclotrisiloxane, 50 grams of methanol and 50 grams of the above described 29 percent aqueous ammonia solution was mixed at room temperature for 77 hours. The reaction product was washed and stripped for 6 hours at 70°

C. leaving a mixture of products having the general formulae $CH_3O[Si(C_6H_5)(CH_3)O]_nH$ and $$HO[Si(C_6H_5)(CH_3)O]_nH$$

in which each $n$ was a multiple of 3. The viscosity at 25° C. of the mixture was 1073.2 cs.

Example 6

A mixture of 111 grams of hexamethylcyclotrisiloxane and 50 grams of trimethylsilanol saturated with ammonia was mixed at room temperature for 88 hours. The product was distilled yielding $(CH_3)_3Si[OSi(CH_3)_2]_3OH$ having a viscosity at 25° C. of 4.98 cs.; $d_4^{25}$ 0.906 and $n_D^{25}$ 1.3961.

Example 7

A mixture of 10 grams of $$HO[(CF_3CH_2CH_2)(CH_3)SiO]_nH$$

where $n$ ranges from 5 to 10 (about 65 cs.), 10 grams of hexamethylcyclotrisiloxane, about 0.2 gram of di-n-hexylamine and about 0.2 gram of acetonitrile was heated for at least 36 hours at 110° C. producing a low visocity linear clear hydroxy-endblocked polymer made up of units of the formulae $[(CF_3CH_2CH_2)(CH_3)SiO]_n$ and $$[(CH_3)_2SiO]_3$$

Example 8

When the following hydroxylated organosilicon compounds are substituted mol per mol for the trimethylsilanol in the preparation of Example 6, the corresponding products result:

| Silanol | Product |
| --- | --- |
| $(C_2H_3)(C_6H_5)(CH_3)SiOSi(CH_3)_2OH$ | $(C_2H_3)(C_6H_5)(CH_3)Si[OSi(CH_3)_2]_4OH$ |
| $(CH_3CH_2OCH_2CH_2)(CH_3)_2SiOH$ | $(CH_3CH_2OCH_2CH_2)(CH_3)_2Si[OSi(CH_3)_2]_3OH$ |
| $(CF_3CF_2OCF_2CF_2)(CH_3)_2SiOH$ | $(CF_3CF_2OCF_2CF_2)(CH_3)_2Si[OSi(CH_3)_2]_3OH$ |

Example 9

When the following cyclotrisiloxanes are substituted mol per mol for the sym-tris-3,3,3-trifluoropropyltrimethylcyclotrisiloxane in the preparation of Example 3, the corresponding products result:

| Cyclotrisiloxane | Product |
| --- | --- |
| $[(C_6H_5)(CH_3)SiO]_3$ | $HO[(C_6H_5)(CH_3)SiO]_3H$ |
| $[(CH_3CH_2OCH_2CH_2)(CH_3)SiO]_3$ | $HO[(CH_3CH_2OCH_2CH_2)(CH_3)SiO]_3H$ |
| $[(\overline{CH_2OCH_2CH_2CH})(CH_3)SiO]_3$ | $HO[(\overline{CH_2OCH_2CH_2CH})(CH_3)SiO]_3H$ |
| $[(ClC_6H_4CH_2OCH_2CH_2CH_2)(CH_3)SiO]_3$ | $HO[(ClC_6H_4CH_2OCH_2CH_2CH_2)(CH_3)SiO]_3H$ |

Example 10

When $(ClC_6H_4)(C_6H_5)Si(OH)_2$ is substituted mol per mol for the $HO[(CF_3CH_2CH_2)(CH_3)SiO]_{10}H$ in the experiment of Example 7, the resulting product is a linear hydroxyl-endblocked copolymer of $$[(ClC_6H_4)(C_6H_5)SiO]$$

units and $[(CH_3)_2SiO]_3$ units.

Example 11

When a mixture of 13 grams of sym-trimethyltrivinylcyclotrisiloxane and 390 grams of $HO[(CH_3)_2SiO]_{1000}H$ saturated with ammonia is mixed at room temperature for 100 hours, the product is a linear hydroxyl-endblocked copolymer of $[(C_2H_3)(CH_3)SiO]_3$ units and $$[(CH_3)_2SiO]_{1000}$$

units.

Example 12

When the following alcohols are substituted mol per mol for the n-butanol in the experiment of Example 1, the following products are produced:

| Alcohol | Product |
| --- | --- |
| $CH_2=CHCH_2OH$ | $CH_2=CHCH_2O[Si(CH_3)_2O]_9H$ |
| $(CH_3)_3COH$ | $(CH_3)_3CO[Si(CH_3)_2O]_9H$ |
| $C_6H_5CH_2OH$ | $C_6H_5CH_2O[Si(CH_3)_2O]_9H$ |
| $(CH_3)_2CHOH$ | $(CH_3)_2CHO[Si(CH_3)_2O]_9H$ |
| $HOCH_2CH_2OH$ | A linear hydroxy-endblocked copolymer of $[Si(CH_3)_2O]$ units and $[CH_2CH_2O]$ units. |

That which is claimed is:

1. The method which comprises reacting a hexaorganocyclotrisiloxane of the formula $(R_2SiO)_3$ with a hydroxylated compound selected from the group consisting of water, hydrocarbon alcohols of no more than about eight carbon atoms and organosilicon compounds of the formulae $R(SiR_2O)_nH$ and $HO(SiR_2O)_nH$ in which each $n$ is a positive integer in contact with a basic amino compound having a basic dissociation constant in dilute soluton in water ranging from $10^{-7}$ to $10^{-1}$ at 25° C., each R substituent in the organosilicon components being monovalent radicals selected from the group consisting of hydrocarbon radicals, halogenoaromatic hydrocarbon radicals, fluorinated hydrocarbon radicals, hydrocarbon ether radicals, halogenoaromatic hydrocarbon ether radicals and fluorinated hydrocarbon ether radicals.

2. The method which comprises reacting a hexaorganocyclotrisiloxane of the formula $(R_2SiO)_3$ with a hydroxylated compound selected from the group consisting of water, hydrocarbon alcohols of no more than about 8 carbon atoms and organosilicon compounds of the formulae $RO(SiR_2O)_nH$ and $HO(SiR_2O)_nH$ in which each $n$ is a positive integer in contact with ammonia, each R substituent in the organiosilicon components being a monovalent radical selected from the group consisting of hydrocarbon radicals, halogenoaromatic hydrocarbon radicals, fluorinated hydrocarbon radicals, hydrocarbon ether radicals, halogenoaromatic hydrocarbon ether radicals and fluorinated hydrocarbon ether radicals.

3. The method which comprises reacting a hexaorganocyclotrisiloxane of the formula $(R_2SiO)_3$ wherein each R is a monovalent radical selected from the group consisting of hydrocarbon radicals, halogenaoaromatic hydrocarbon radicals, fluorinated hydrocarbon radicals, hydrocarbon ether radicals, halogenoaromatic hydrocarbon ether radicals, and fluorinated hydrocarbon ether radicals with a monohydric hydrocarbon alcohol of no more than about 8 carbon atoms in contact with a basic amino compound having a basic dissociation constant in dilute solution in water ranging from $10^{-7}$ to $10^{-1}$ at 25° C.

References Cited in the file of this patent

UNITED STATES PATENTS

| | | |
|---|---|---|
| 2,416,503 | Trautman et al. | Feb. 25, 1947 |
| 2,863,897 | Wehrly | Dec. 9, 1958 |
| 3,018,270 | Toogood | Jan. 23, 1962 |
| 3,036,035 | Riley | May 22, 1962 |
| 3,046,293 | Pike | July 24, 1962 |
| 3,046,294 | Pike | July 24, 1962 |

FOREIGN PATENTS

| | | |
|---|---|---|
| 580,100 | Canada | July 21, 1959 |

OTHER REFERENCES

Shostakovski et al.: "Chemical Abstracts," vol. 54, col. 1 (1960).

UNITED STATES PATENT OFFICE
CERTIFICATE OF CORRECTION

Patent No. 3,146,251                                August 25, 1964

Paul L. Brown et al.

It is hereby certified that error appears in the above numbered patent requiring correction and that the said Letters Patent should read as corrected below.

Column 3, line 38, for "2,66,909" read -- 2,662,909 --; column 4, line 66, for "HO[SI($C_2H_3$)($CH_3$)O]$_n$H" read -- HO[Si($C_2H_3$)($CH_3$)O]$_n$H --.

Signed and sealed this 2nd day of March 1965.

(SEAL)
Attest:

ERNEST W. SWIDER                              EDWARD J. BRENNER
Attesting Officer                                  Commissioner of Patents